(12) United States Patent
Bangarambandi et al.

(10) Patent No.: US 11,328,706 B2
(45) Date of Patent: May 10, 2022

(54) SYSTEM AND METHOD FOR MULTILINGUAL CONVERSION OF TEXT DATA TO SPEECH DATA

(71) Applicant: OSLABS PTE. LTD., Singapore (SG)

(72) Inventors: Sudhir Bangarambandi, Mumbai (IN); Akash Motilal Dongre, Mumbai (IN)

(73) Assignee: OSLABS PTE, LTD., Singapore (SG)

( * ) Notice: Subject to any disclaimer, the term of this patent is extended or adjusted under 35 U.S.C. 154(b) by 564 days.

(21) Appl. No.: 16/319,430

(22) PCT Filed: Jul. 21, 2017

(86) PCT No.: PCT/IB2017/054413
§ 371 (c)(1),
(2) Date: Jan. 21, 2019

(87) PCT Pub. No.: WO2018/015927
PCT Pub. Date: Jan. 25, 2018

(65) Prior Publication Data
US 2021/0312899 A1      Oct. 7, 2021

(30) Foreign Application Priority Data

Jul. 21, 2016  (SG) .......................... 10201606009X

(51) Int. Cl.
*G06F 17/00*    (2019.01)
*G10L 13/08*    (2013.01)
(Continued)

(52) U.S. Cl.
CPC ............ *G10L 13/08* (2013.01); *G06F 3/0482* (2013.01); *G06F 40/263* (2020.01); *G06F 40/42* (2020.01)

(58) Field of Classification Search
CPC ...... G06F 3/0482; G06F 40/263; G06F 40/42; G10L 13/08
See application file for complete search history.

(56) References Cited

U.S. PATENT DOCUMENTS

| 2005/0267736 | A1* | 12/2005 | Nye | ........................ | G06F 40/58 |
|---|---|---|---|---|---|
| | | | | | 704/8 |
| 2009/0271175 | A1* | 10/2009 | Bodin | ..................... | G10L 13/00 |
| | | | | | 704/2 |
| 2012/0109655 | A1* | 5/2012 | Burns | ..................... | H04L 51/38 |
| | | | | | 704/260 |

OTHER PUBLICATIONS

Yin et al., Utilizing Text-to-Speech to Assist Bilingual Teaching, IEEE, 2010, p. 594-597 (Year: 2010).*
(Continued)

*Primary Examiner* — Andrew T McIntosh
(74) *Attorney, Agent, or Firm* — Barry Choobin; Patent 360LLC

(57) ABSTRACT

The present invention provides a system and method for converting text data into speech data. Initially, the system enables a user to select a language from a plurality of languages supported by the operating system (OS) of a computing device. Further, on selecting and copying any text data, the system provides the user with options to listen to an audio output of the text data. The user is provided with options to listen to text data in either English or the selected language, when the language of the text data is one among the plurality of languages supported by the OS. Further, the user is provided with options to listen to text data in English, for the text data in any language. Once the user selects the option, the system converts the text data to speech data. The speech data is provided as the audio output to the user.

8 Claims, 5 Drawing Sheets

(51) Int. Cl.
*G06F 40/42* (2020.01)
*G06F 40/263* (2020.01)
*G06F 3/0482* (2013.01)

(56) References Cited

OTHER PUBLICATIONS

Miyabe et al., Design of Face-to-Face Multilingual Communication Environment for Illiterate People, LNCS 5623, pp. 283-292, 2009 (Year: 2009).*

* cited by examiner

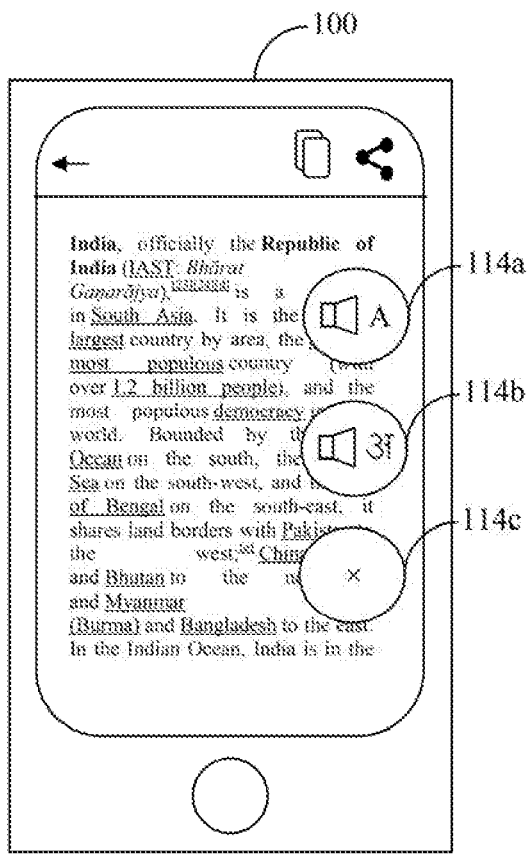
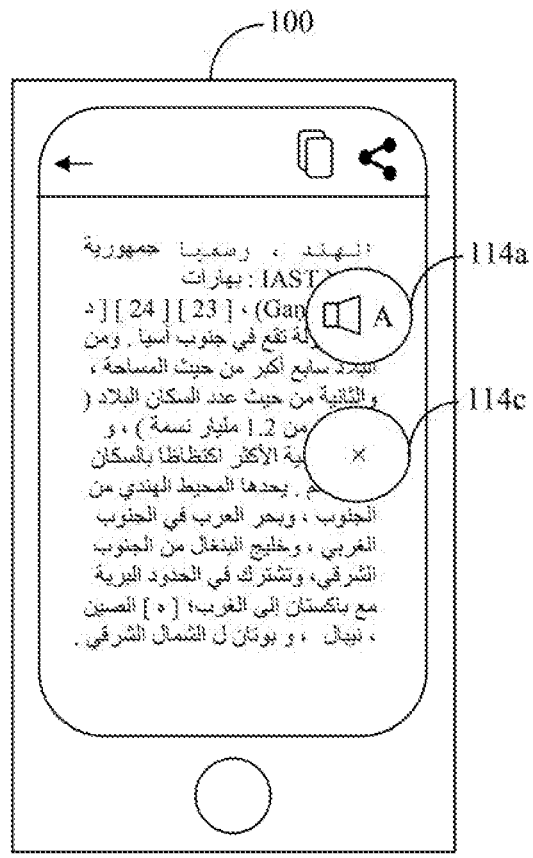
FIG. 1B
FIG. 1C

SYSTEM AND METHOD FOR MULTILINGUAL CONVERSION OF TEXT DATA TO SPEECH DATA

CROSS-REFERENCE TO RELATED APPLICATIONS

This Patent Application is a National Phase Application corresponding to the PCT Application No. PCT/IB2017/054413 filed on Jul. 21, 2017 with the title "A SYSTEM AND METHOD FOR MULTILINGUAL CONVERSION OF TEXT DATA TO SPEECH DATA". This Patent Application claims the priority of the Singapore Provisional Patent Application No. 10201606009X filed on Jul. 21, 2016 with the title "A SYSTEM AND METHOD FOR MULTILINGUAL CONVERSION OF TEXT DATA TO SPEECH DATA", the contents of which is included herein by the way of reference.

BACKGROUND

Technical Field

The present invention is generally related to text to speech conversion techniques. The present invention is particularly related to a system for processing text to speech conversion in multiple languages. The present invention is more particularly related to a system and method for converting text data into speech data in a language chosen by a user.

Description of the Related Art

Over the last few decades, the world has witnessed a drastic development as far as the developments in electronic devices and communications are concerned. The electronic devices have replaced the age-old technology of telephones for better and smooth communication. The electronic devices include a smart phone, a tablet, a laptop, a palmtop etc. Apart from communication, the electronic devices provide different services, features and applications to a user.

The electronic devices comprise features enabling the users to set a language for user interface. The language set for the user interface is a regional language of the user, thereby enabling the user to use the electronic device without any language barrier. However, it becomes difficult for a user to use certain applications in the electronic device when the applications are not presented in a language unknown to the user. Currently, there are features that allow the user to receive text messages as audio messages. However, the problem remains when the user browses the internet or uses other applications. Further, when the user receives information in an unknown language, it becomes more inconvenient for the users to use the electronic devices.

Hence, there is a need for a system and method to convert text data to speech data in multiple languages. There is also a need for a system and method of performing text to speech conversion for a plurality of applications in the electronic devices. There is further a need enable a user to listen to the audio of a text data from any application in a language chosen by the user. Further, there is also a need for a system and method enable the user to listen to audio of the text data even when the text data in a language unknown language.

The above mentioned shortcomings, disadvantages and problems are addressed herein, which will be understood by reading and studying the following specification.

OBJECTS OF THE EMBODIMENTS HEREIN

The primary object of the present invention is to provide system and method of processing text to speech conversion in multiple languages.

Another object of the present invention is to provide a system and method of converting a text data to speech data in a language chosen by a user.

Yet another objective of the present invention is to provide a user with an option to listen to a text data read-out while selecting and copying a particular text data.

Yet another objective of the present invention is to provide a system and method to convert any text in any language, which is copied to the temporary storage clipboard of the computing device, to audio in a different language chosen by a user.

Yet another objective of the present invention is to provide a user with options for selecting a language from a plurality of languages supported by the operating system for listening audio of a text data.

Yet another objective of the present invention is to provide a system and method for converting text data from a plurality of languages supported by the operating system to speech data in a language chosen by the user.

Yet another objective of the present invention is to provide a system and method for enabling a user to listen to a text data read out as audio data in the user's regional language.

Yet another objective of the present invention is to provide the feature of text to speech conversion in multiple languages for a plurality of applications in computing devices.

These and other objects and advantages of the present invention will become readily apparent from the following detailed description taken in conjunction with the accompanying drawings.

SUMMARY

The various embodiments of the present invention provide a system and method for converting text data into speech data in multiple languages. Initially, the system enables a user to select a language from a plurality of languages supported by an operating system (OS) of an electronic device. Further, on selecting and copying any text data, the system provides the user with options to listen to an audio output of the selected text data. The user is provided with options to listen to text data in either English or a selected language, when the language of the text data is one among the plurality of languages supported by the OS. Further, the user is provided with options to listen to text data in English when the language of the text data is a language other than the plurality of languages supported by the OS. Once the user selects the option, the system converts the text data to the audio output in English or the selected language based on the option selected by the user.

According to one embodiment of the present invention, a system for converting text data into speech data in multiple languages in an electronic device is provided. The system comprises an event monitor, an event manager, a text to speech conversion (TTS) engine, a user interface (UI) controller, a language processor and an audio output unit. The system for converting text data to speech data is embedded as a feature of operating system of the electronic device. The operating system of the electronic device supports a plurality of languages. Initially, a user is enabled to select a language from the plurality of languages supported by the operating system. The plurality of language comprises regional languages including but not limited to Hindi, Kannada, Tamil, Telugu, Malayalam and the like.

The event monitor in the system is configured to monitor when an event is occurred related to a text data. The event includes but is not limited to selecting and copying the text data. On identifying the occurrence of the event, the event monitor informs the event manager. The event manager coordinates the working of the TTS engine, the UI controller, the language processor and the audio output unit. The event manager initially coordinates the language processor to identify when language of the text data is one among the plurality of languages supported by the operating system.

Further, the event manager coordinates the UI controller to generate a plurality of options for listening to the audio output of the text data. The UI controller provides the user with a first set of options among the plurality of options, when the language of the text data is one among the plurality of languages supported by the operating system. The first set of options includes a first option to listen to the audio output in English, a second option to listen to the audio output in the selected language among the plurality of languages and a third option to choose not to listen to the audio output. Further, the UI controller provides the user with a second set of options among the plurality of options, when the language of the text data any language other than the plurality of languages supported by the operating system. The second set of options includes the first option to listen to the audio output of the text data in English, and the third option to choose not to listen to the audio output.

The event manager further coordinates the language processor to translate the text data into English or the selected language based on the option selected from the plurality of options. Further, the event manager coordinates the TTS engine to convert the translated text data to speech data in corresponding language. Further, the speech data is provided to the user through the audio output unit based on the option selected by the user.

According to an embodiment of the present invention, a method of converting text data into speech data in multiple languages in an electronic device is provided. The method includes selecting a language from a plurality of languages supported by the operating system. The plurality of language comprises regional languages including but not limited to Hindi, Kannada, Tamil, Telugu, Malayalam and the like. The method includes monitoring any event related to a text data in the electronic device. The event includes but is not limited to selecting and copying the text data. Once an event occurs, the method detects language of the text data. Further, the method includes identifying when the language of the text data is one among the plurality of languages supported by the operating system.

The method further includes providing the user with a plurality of options on user interface of the electronic device. The user is provided with a first set of options among the plurality of options when the language of the text data is one among the plurality of languages supported by the operating system. The first set of options includes a first option to listen to the audio output in English, a second option to listen to the audio output in the selected language and a third option to choose not to listen to the audio output. Further, the user is provided with a second set of options among the plurality of options, when the language of the text data is a language other than the plurality of languages supported by the operating system. The second set of options includes the first option and the third option.

Further, the method includes translating the text data into one of English and the selected language. The text data is translated based on the option selected by the user. The method further converts the translated text data to speech data in the corresponding language. The speech data is provided as an audio output to the user. Therefore, the user is enabled to listen to the audio output of the text data based on the option selected by the user.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which:

FIG. 1B illustrates an electronic device providing a first set of options to a user for listening to audio of a text data, according to one embodiment of the present invention.

FIG. 1C illustrates an electronic device providing a second set of options to a user for listening to audio of a text data, according to one embodiment of the present invention.

Figure 1A:
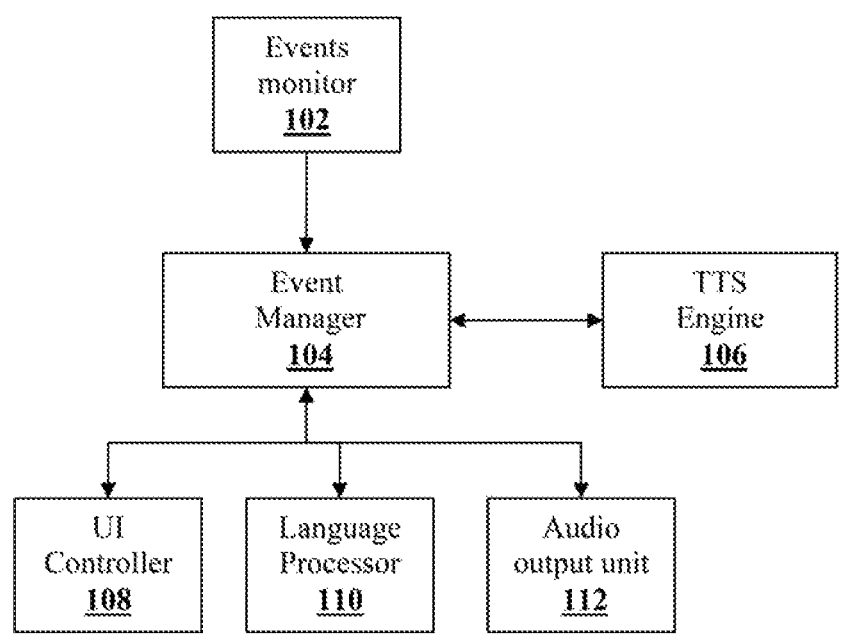
FIG. 1A illustrates a functional block diagram of a system for converting text data into speech data in multiple languages in an electronic device, according to one embodiment of the present invention.

Although the specific features of the present invention are shown in some drawings and not in others. This is done for convenience only as each feature may be combined with any or all of the other features in accordance with the present invention.

DETAILED DESCRIPTION OF THE EMBODIMENTS

In the following detailed description, a reference is made to the accompanying drawings that form a part hereof and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The various embodiments of the present invention provide a system and method for converting text data into speech data in multiple languages. Initially, the system enables a user to select a language from a plurality of languages supported by the operating system (OS) of the electronic device. Further, on selecting and copying any text data, the system provides the user with options to listen to an audio output of the selected text data. The user is provided with options to listen to text data in either English or the selected language when the language of the text data is one among the plurality of languages supported by the OS. Further, the user is provided with options to listen to text data in either English, when the language of the text data is any language other than the plurality of languages supported by the OS. Once the user selects the option, the system converts the text data to the audio output in English or the selected language based on the option selected by the user.

According to one embodiment of the present invention, a system for converting text data into speech data in multiple languages in an electronic device is provided. The system comprises an event monitor, an event manager, a text to speech conversion (TTS) engine, a user interface (UI) controller, a language processor and an audio output unit. The system for converting text data to speech data is embedded as a feature of operating system of the electronic device. The operating system of the electronic device supports a plurality of languages. Initially, a user is enabled to select a language from the plurality of languages supported by the operating system. The plurality of language comprises regional languages including but not limited to Hindi, Kannada, Tamil, Telugu, Malayalam and the like.

The event monitor in the system is configured to monitor when an event is occurred related to a text data. The event includes but is not limited to selecting and copying the text data. On identifying the occurrence of the event, the event monitor informs the event manager. The event manager coordinates the working of the TTS engine, the UI controller, the language processor and the audio output unit. The event manager initially coordinates the language processor to identify when language of the text data is one among the plurality of languages supported by the operating system.

Further, the event manager coordinates the UI controller to generate a plurality of options for listening to the audio output of the text data. The UI controller provides the user with a first set of options among the plurality of options, when the language of the text data is one among the plurality of languages supported by the operating system. The first set of options includes a first option to listen to the audio output in English, a second option to listen to the audio output in the selected language among the plurality of languages and a third option to choose not to listen to the audio output. Further, the UI controller provides the user with a second set of options among the plurality of options, when the language of the text data any language other than the plurality of languages supported by the operating system. The second set of options includes the first option to listen to the audio output of the text data in English, and the third option to choose not to listen to the audio output.

The event manager further coordinates the language processor to translate the text data into English or the selected language based on the option selected from the plurality of options. Further, the event manager coordinates the TTS engine to convert the translated text data to speech data in corresponding language. Further, the speech data is provided to the user through the audio output unit based on the option selected by the user.

According to an embodiment of the present invention, a method of converting text data into speech data in multiple languages in an electronic device is provided. The method includes selecting a language from a plurality of languages supported by the operating system. The plurality of language comprises regional languages including but not limited to Hindi, Kannada, Tamil, Telugu, Malayalam and the like. The method includes monitoring any event related to a text data in the electronic device. The event includes but is not limited to selecting and copying the text data. Once an event occurs, the method detects language of the text data. Further, the method includes identifying when the language of the text data is one among the plurality of languages supported by the operating system.

The method further includes providing the user with a plurality of options on user interface of the electronic device. The user is provided with a first set of options among the plurality of options when the language of the text data is one among the plurality of languages supported by the operating system. The first set of options includes a first option to listen to the audio output in English, a second option to listen to the audio output in the selected language and a third option to choose not to listen to the audio output. Further, the user is provided with a second set of options among the plurality of options, when the language of the text data is a language other than the plurality of languages supported by the operating system. The second set of options includes the first option and the third option.

Further, the method includes translating the text data into one of English and the selected language. The text data is translated based on the option selected by the user. The method further converts the translated text data to speech data in the corresponding language. The speech data is provided as an audio output to the user. Therefore, the user is enabled to listen to the audio output of the text data based on the option selected by the user.

According to an embodiment of the present invention, the system for converting text data into speech data in multiple languages in an electronic device having operating system, which supports a plurality of languages, the system comprising:
  an event monitor configured to monitor any event related to a text data, which includes but is not limited to selecting and copying the text data.
  an event manager configured to receive information of occurrence of event related to text data from the event manager;
  a user interface (UI) controller configured to provide a set of options to a user to listen to the audio output in any one of available plurality of languages in the operating system;
  a language processor adapted to translate the text data into English or the selected language based on the option selected by a user from the plurality of options provided by the UI controller to generate translated text data;
  a Text to speech conversion (TTS) engine configured to convert the translated text data into speech data in selected language; and
  an audio output unit adapted to provide to the user the speech data in selected language.

According to an embodiment of the present invention, the user is enabled to select a language from the plurality of languages supported by the operating system, the plurality of languages includes English, Chinese, Japanese, French, German and other regional languages including but not limited to Hindi, Kannada, Tamil, Telugu, Malayalam and the like.

According to an embodiment of the present invention, the UI controller provide following set of options based on language of the text data recognized by the event manager:
a. when the text data is in a language supported by the operating system, the UI controller provide options to listen audio output in a language supported by the operating system, to listen audio output in English or not to listen to audio output;
b. when the text data is in a language other than the plurality of language supported by the operating system, the UI controller provide option to the user to listen to the audio output of the text data in English, or not to listen to the audio output.

FIG. 1A illustrates a functional block diagram of a system for converting text data into speech data in multiple languages in an electronic device, according to one embodiment of the present invention. FIG. 1B illustrates an electronic device providing a first set of options to a user for listening to audio of a text data, according to one embodiment of the present invention. FIG. 1C illustrates an electronic device providing a second set of options to a user for listening to audio of a text data, according to one embodiment of the present invention.

With respect to FIG. 1A-FIG. 1C, the system for converting text data into speech data in an electronic device is explained. The system for converting text data to speech data is implemented as a feature of operating system (OS) of the electronic device 100. The examples of electronic device 100 include but are not limited to a smart phone, a tablet, a mobile phone and the like. The examples of operating system in the electronic device include Linux, Windows, VMS, OS/400, AIX, and z/OS and the like. The operating system of the electronic device 100 supports a plurality of languages. Initially a user is enabled to set a language for the user interface by selecting a language from the plurality of languages supported by the operating system. The plurality of language comprises regional languages including but not limited to Hindi, Kannada, Tamil, Telugu, Malayalam and the like.

According to an embodiment of the present invention, the system comprises an event monitor 102, an event manager 104, a text to speech conversion (TTS) engine 106, a user interface (UI) controller 108, a language processor 110 and an audio output unit 112. The event monitor 102 is configured to continuously monitor when an event is occurred related to the text data in any applications in the electronic device 100. The text data includes a part of textual information from any applications including internet browser, text messages, WhatsApp Messenger etc. The example of the event includes but is not limited to selecting and copying the text data. On identifying the occurrence of the event, the event monitor 102 informs the event manager 104.

The event manager 104 coordinates the working of the ITS engine 106, the UI controller 108, the language processor 110 and the audio output unit 112. The event manager 104 initially coordinates the language processor 110 to identify when language of the text data is one among the plurality of languages supported by the operating system. Once the language of the text data is detected, the event manager 104 coordinates the UI controller 108 to generate a plurality of options 114a, 114b and 114c for enabling a user to listen to the audio output of the text data. The plurality of options 114a, 114b and 114c are displayed as icons on the user interface of the electronic device 100. The user is enabled to listen to the audio output of the text data by pressing on the icon representing an option.

The UI controller 108 provides the user with a first set of options among the plurality of options 114a, 114b and 114c, when the language of the text data is one among the plurality of languages supported by the operating system. The first set of options includes a first option 114a, a second option 114b and a third option 114c. The first option 114a enables the user to listen to the audio output of the text data in English. The second option 114b enables the user to listen to the audio output of the data in the selected language among the plurality of languages. The third option 114c enables the user to choose not to listen to the audio output.

Further, the UI controller 108 provides the user with a second set of options among the plurality of options 114a, 114b and 114c, when the language of the text data is a language other than the plurality of languages supported by the operating system. The second set of options includes the first option 114a and the third option 114c. The icons for the plurality of option 114a, 114b and 114c immediately pops up on the user interface of the electronic device 100 when the event is occurred.

According to an embodiment of the present invention, the user is enabled to press a first icon representing first option 114a for listening to the text data in English. The event manager 104 checks when the text data is in English when the user press the first icon. When the text data is in any other language other than English, the event manager 104 coordinates the language processor 110 to translate the text data into English. Further, the event manager 104 coordinates the TTS engine 106 to convert the text data to speech data in English. The speech data generated by the TTS engine 106 is provided as audio output to the user through the audio output unit 112. The first option is provided in both the first set of options and the second set of options. Therefore, the user is enabled to listen to the audio output of the text data, when the actual text data is in English or plurality of languages or any other language other than the plurality of languages.

The user is enabled to press a second icon representing the second option 114b for listening to the text data in the selected language among the plurality of languages. For example, consider the plurality of languages supported by the operating system includes Hindi, Kannada, Tamil, Telugu, and Malayalam. The user is enabled to initially select one of the pluralities of languages as the user interface language. Consider that the user selects the language Hindi as the user interface language. Then the second option 114b enables a user to listen the text data from any application in the electronic device 100 in the language Hindi.

When the user press the second icon representing the second option 114b for listening the audio of the text data in the selected language, the event manager 104 checks when the text data is in the selected language. When the text data is in any other language other than the selected language, the event manager 104 coordinates the language processor 110 to translate the text data into the selected language. Further, the event manager 104 coordinates the TTS engine 106 to convert the text data to speech data in the selected language. The speech data generated by the TTS engine 106 is provided as audio output to the user through the audio output unit 112. The second option 114b is provided only in the first set of options. Therefore, the user is enabled to listen to the audio output of the text data, when the actual text data is in one of English and plurality of languages supported by the operating system. When the text data is in any language other than the plurality of languages supported by the operating system, the second option 114b is not provided to the user. Further, the user is also enabled to press a third icon representing the third option 114c to choose not to listen to the audio output.

According to an embodiment of the present invention, a method for converting text data into speech data in multiple languages in an electronic device having operating system, which supports a plurality of languages is disclosed, wherein the method comprising steps of:

monitoring any event related to a text data, which includes but is not limited to selecting and copying the text data by an event monitor;

receiving information of occurrence of event related to text data by an event manager from the event monitor;

providing set of options to a user to listen to the audio output in any one of available plurality of languages in the operating system by a user interface (UI) controller;

translating the text data into English or the selected language based on the option selected by a user from the plurality of options provided by the UI controller to generate translated text data by a language processor;

converting the translated text data into speech data in selected language by a Text to speech conversion (TTS) engine; and providing speech data output in the selected language to the user by an audio output unit.

According to an embodiment of the present invention, the user is enabled to select a language from the plurality of languages supported by the operating system, the plurality of languages includes English, Chinese, Japanese, French, German and other regional languages including but not limited to Hindi, Kannada, Tamil, Telugu, Malayalam and the like. Further, the UI controller provide following set of options to the user based on language of the text data recognized by the event manager:

a. when the text data is in a language supported by the operating system, the UI controller provide options to listen audio output in a language supported by the operating system, to listen audio output in English or not to listen to audio output;

b. when the text data is in a language other than the plurality of language supported by the operating system, the UI controller provide option to the user to listen to the audio output of the text data in English, or not to listen to the audio output.

Figure 2A:
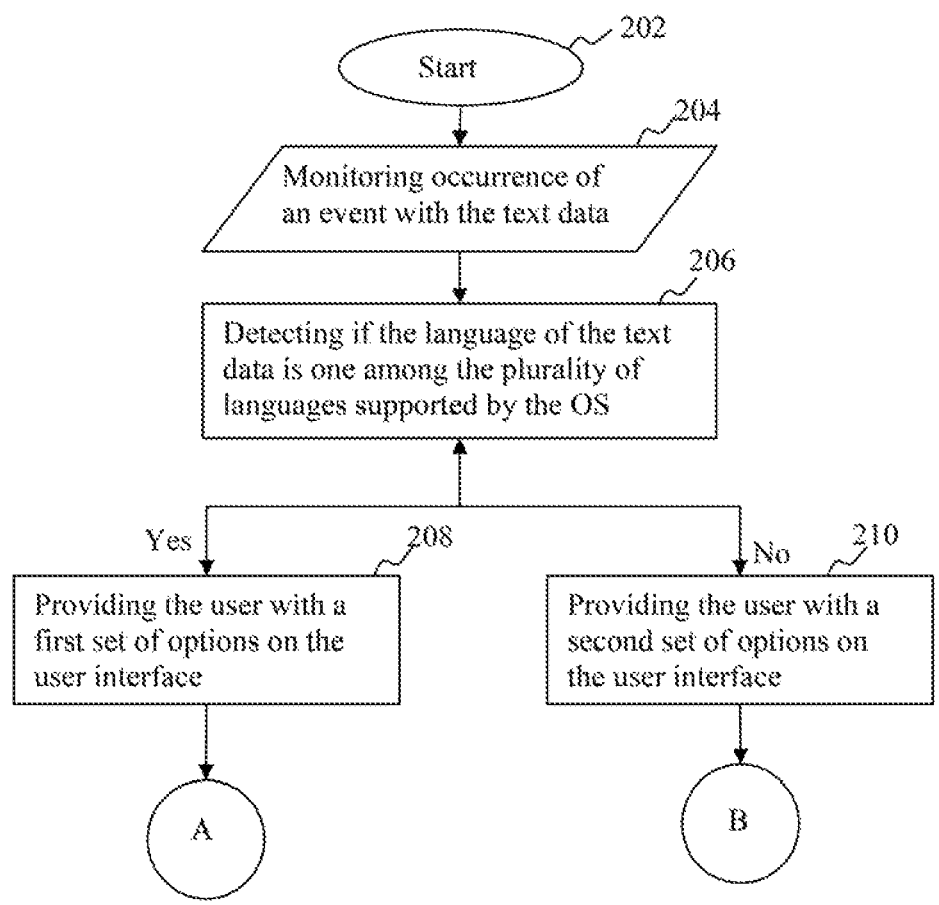
FIG. 2A illustrates a first part of a flow chart explaining a method of converting text data into speech data in multiple languages in an electronic device, according to one embodiment of the present invention.
Figure 2B:
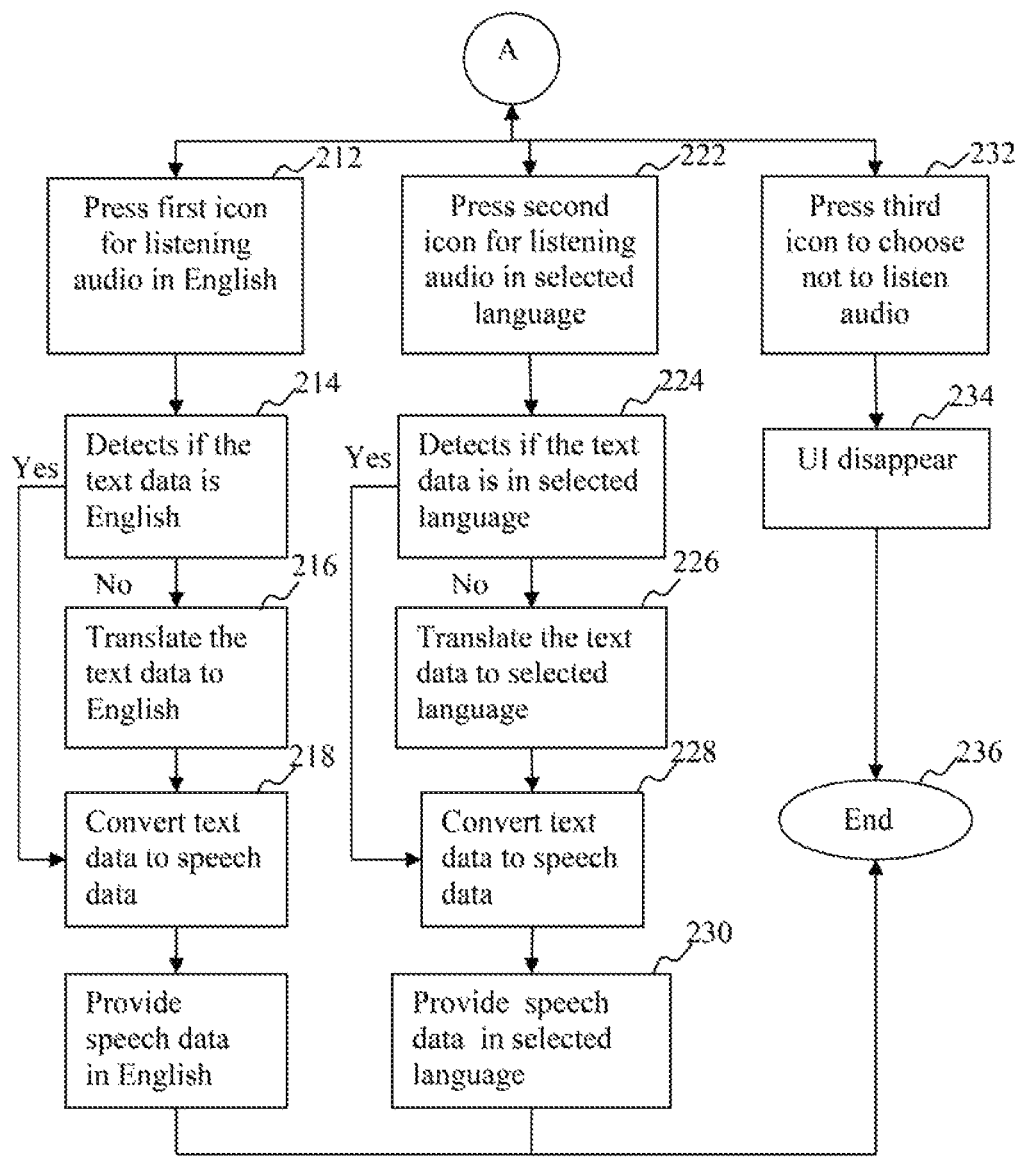
FIG. 2B illustrates a second part of the flow chart explaining the method of converting text data into speech data in multiple languages in an electronic device, according to one embodiment of the present invention.
Figure 2C:
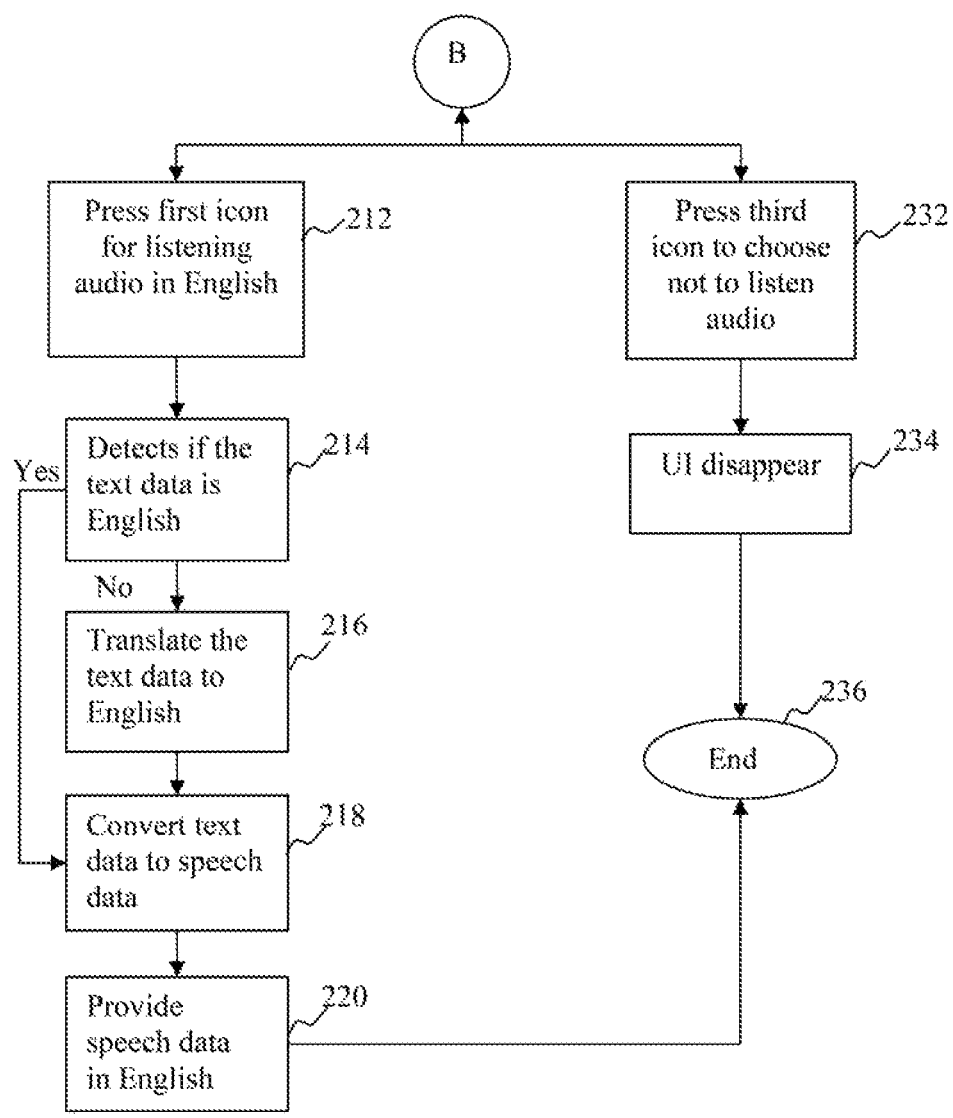
FIG. 2C illustrates a third part of the flow chart explaining the method of converting text data into speech data in multiple languages in an electronic device, according to one embodiment of the present invention.

FIG. 2A illustrates a first part of a flow chart explaining a method of converting text data into speech data in multiple languages in an electronic device, according to one embodiment of the present invention. FIG. 2B illustrates a second part of the flow chart explaining a method of converting text data into speech data in multiple languages in an electronic device, according to one embodiment of the present invention. FIG. 2C illustrates a third part of the flow chart explaining a method of converting text data into speech data in multiple languages in an electronic device, according to one embodiment of the present invention.

With respect to FIG. 2A-FIG. 2C, the method is explained. The method starts at step 202. The method includes monitoring occurrence of an event related to a text data in an electronic device (204). The event includes but is not limited to selecting and copying a text data. Once an event occurs, the method detects when the language of the text data is one among a plurality of languages supported by the Operating System (206). The plurality of language comprises regional languages including but not limited to Hindi, Kannada, Tamil, Telugu, Malayalam and the like. A user is initially enabled to select a language from the plurality of languages supported by the operating system.

Further, the user is provided with a plurality of options on user interface of the electronic device. Hie plurality of options is provided based on whether the language of text data is one among the plurality of languages supported by the OS. When the language of the text data is one among the plurality of languages supported by the operating system, the method provides the user with a first set of options on the user interface (208). The first set of options includes a first option to listen to the audio output in English, a second option to listen to the audio output in the selected language and a third option to choose not to listen to the audio output. Further, when the language of the text data is a language other than the plurality of languages supported by the operating system, the method provides the user with a second set of options on the user interface (210). The second set of options includes the first option and the third option. The first set of options and the second set of options arc displayed using icons on the user interface.

Further, on displaying the first set of options and the second set of options on the user interface, the user is enabled to press on an icon representing an option to listen to the audio of the text data. The method enables the user to press a first icon representing the first option for listening to the audio in English (212). The method checks when the text data is in the English (214). When the text data is in any language other than English, the method translates the text data into English (216). Further, the method converts the text data to speech data in English (218). When the text data is in English, the method directly converts the text data to speech data in English (218). The method includes providing the speech data as audio output to the user in English (220).

The method also enables the user to press a second icon representing the second option for listening to the audio in the selected language (222). The method checks when the text data is in the selected language (224). When the text data is in any other language among the plurality of languages, the method translates the text data into selected language (226). Further, the method converts the text data to speech data in selected language (228). When the text data is in selected language, the method directly converts the text data to speech data in selected language (228). The method includes providing the speech data as audio output to the user in selected language (230). Further, the method also enables the user to press the third icon representing the third option to choose not to listen to the audio output (232). When the user press the third icon, all icons on the user interface for listening to the audio output disappears (234). The method ends at step 236.

According to an embodiment of the present invention, a non-transitory computer readable medium having computer readable instructions stored thereupon, said computer readable instructions, when executed by a processor, to configure a computer enabled device to: monitor any event related to a text data, which includes but is not limited to selecting and copying the text data by an event monitor; receive information of occurrence of event related to text data by an event manager from the event monitor; provide set of options to a user to listen to the audio output in any one of available plurality of languages in the operating system by a user interface (UI) controller; translate the text data into English or the selected language based on the option selected by a user from the plurality of options provided by the UI controller to generate translated text data by a language processor; convert the translated text data into speech data in selected language by a Text to speech conversion (TTS)

engine; and provide speech data output in the selected language to the user by an audio output unit Further, the non-transitory computer readable medium, wherein a user is enabled to select a language front the plurality of languages supported by the operating system, the plurality of languages includes English, Chinese, Japanese, French, German and other regional languages including but not limited to Hindi, Kannada, Tamil, Telugu, Malayalam and the like. Furthermore, the non-transitory computer readable medium as claimed in claim 7, wherein the UI controller provide following set of options based on language of the text data recognized by the event manager:

a. when the text data is in a language supported by the operating system, the UI controller provide options to listen audio output in a language supported by the operating system, to listen audio output in English or not to listen to audio output;

b. when the text data is in a language other than the plurality of language supported by the operating system, the UI controller provide option to the user to listen to the audio output of the text data in English, or not to listen to the audio output.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

The present invention provides a method and system for converting the text data into speech data in multiple languages. The system provides the user options to listen to the audio output of a text data from any application in the electronic device. The user is enabled to listen to the audio either in English or in a regional language of user's choice. The user is enabled to choose the language form a plurality of languages supported by the operating system. Therefore, on receiving a text data in any language among the plurality of languages, the user is enabled to opt for listening to the audio output in the language chosen by the user. The system is highly advantageous to people literate only in the regional language.

Further, the system is capable of converting the text data from any language to English. Therefore, the user is enabled to listen to the audio output of a text in any unknown language. The system also enables a user to listen to the audio directly from any application without navigating to setting page in the electronic device. The icons for enabling the user to listen to the audio pops up immediately on the user interface whenever an event happens related to the text data. Therefore, the user is enabled to listen to the audio by merely clicking on the pop up icon.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications.

Although the embodiments herein are described with various specific embodiments, it will be obvious for a person skilled in the art to practice the embodiments herein with modifications.

The scope of the present invention will be ascertained by the claims to be submitted at the time of filing the complete specification.

What is claimed is:

1. A system for converting text data into speech data in multiple languages on an electronic device supporting a plurality of languages, the system comprising a processor configured to execute predefined computer-readable instructions, and wherein said processor is configured with said computer-readable instructions to:

monitor events related to text data displayed on a user interface of the electronic device, and wherein said processor is further configured to monitor at least one of selection and copying of the text data displayed on the user interface;

receive information of about occurrence of at least one of said selection and copying of the text data displayed on the user interface of the electronic device;

in response to receiving information about occurrence of at least one of said selection and copying of the text data, determine whether the text data is in a language supported by the electronic device;

in an event the text data is determined to be in a language supported by the electronic device, trigger a user interface (UI) display a first set of user interface icons on the user interface, the first set of user interface icons configured by said processor to enable a user of the electronic device to request for speech data corresponding to the text data in English and in a second language selected by the user and supported by the electronic device respectively;

in an event the text data is determined to be in a language not supported by the electronic device, trigger the user interface (UT) to display a second set of user interface icons on the user interface, the second set of user interface icons configured by said processor to enable the user to request for the speech data corresponding to the text data only in English and skip requesting the speech data respectively;

trigger the user interface to selectively switch between displaying said first set of user interface icons and said second set of user interface icons, in response to determining whether the text data is in the language supported by the electronic device; and in response to the user selecting a predetermined user interface icon from the second set of user interface icons, selectively convert the text data into speech data in English.

2. The system as claimed in claim 1, wherein the processor is further configured to enable the user to select ft the second language from a group of languages consisting of English, Chinese, Japanese, French, German, Hindi, Kannada, Tamil, Telugu, and Malayalam.

3. The system as claimed in claim 1, wherein said processor is further configured to translate the text data into at least one of the second language selected by the user and English, and generate translated text data, in response to the user selecting a corresponding user interface icon from the first set of user interface icons, said processor further configured to convert the translated text data into the speech data.

4. The system as claimed in claim 1, wherein the processor is configured to enable the user to at least request for the speech data corresponding to the text data in English, by activating at least one user interface icon among said second set of user interface icons, in an event the text data is in a language not supported by the electronic device.

5. The system as claimed in claim 1, wherein the processor is further configured to trigger a display of at least one of said first set of user interface icons and said second set of user interface icons as at least a part of every application window displayed on the user interface, and wherein said processor enables said user to access said first set of user interface icons and said second set of user interface icons without navigating from a user interface screen displaying the text data.

6. A method for converting text data into speech data in multiple languages in an electronic device supporting a plurality of languages, the method comprises the following steps:
monitoring events relevant to text data displayed on a user interface of the electronic device, and wherein monitored events include selection and copying of the text data;
receiving information about occurrence of at least one of said selection and copying of the text data displayed on the user interface of the electronic device;
in response to receiving information about occurrence of at least one of said selection and copying of the text data, determining whether the text data is in a language supported by the electronic device;
in an event the text data is determined to be in a language supported by the electronic device, triggering a user interface (UI) to display a first set of user interface icons on the user interface, and configuring the first set of user interface icons to enable the user to request for speech data corresponding to the text data in English and in a second language selected by the user and supported by the electronic device respectively;
in an event the text data is determined to be in a language not supported by the electronic device, triggering the user interface (UI) to display a second set of user interface icons on the user interface, and configuring the second set of user interface icons to enable the user to request for the speech data corresponding to the text data only in English and to skip requesting the speech data respectively; and
triggering the user interface to selectively switch between displaying said first set of user interface icons and said second set of user interface icons, in response to determining whether the text data is in the language supported by the electronic device; and
in response to the user selecting a predetermined user interface icon from the second set of user interface icons, selectively converting the text data into speech data in English.

7. The method as claimed in claim 6, wherein the method further includes the step of directly converting the text data into speech data, only in an event a language of the text data and the second language selected by the user is determined to be same.

8. A non-transitory computer readable medium having computer readable instructions stored thereon, said computer readable instructions, when executed by a processor, cause said processor to:
monitor any events related to a text data displayed on a user interface of the electronic device, and wherein the events monitored by said processor include selection and copying of the text data displayed on the user interface;
receive information of about occurrence of at least one of said selection and copying of the text data displayed on the user interface of the electronic device;
in response to receiving information about occurrence of at least one of said selection and copying of the text data, determine whether the text data is in a language supported by the electronic device;
in an event the text data is determined to be in a language supported by the electronic device, trigger a user interface (UI) to display a first set of user interface icons on the user interface, and configure the first set of user interface icons to enable the user to request for speech data corresponding to the text data in English and in a second language selected by the user and supported by the electronic device respectively;
in an event the text data is determined to be in a language not supported by the electronic device, trigger the user interface (UI) to display a second set of user interface icons on the user interface, and configure the second set of user interface icons to enable the user to request for the speech data corresponding to the text data only in English and to skip requesting the speech data respectively; and
trigger the user interface to selectively switch between displaying said first set of user interface icons and said second set of user interface icons, in response to determining whether the text data is in the language supported by the electronic device; and
in response to the user selecting a predetermined user interface icon from the second set of user interface icons, selectively convert the text data into speech data in English.

* * * * *